(12) United States Patent
Yue et al.

(10) Patent No.: US 8,195,953 B1
(45) Date of Patent: Jun. 5, 2012

(54) COMPUTER PROGRAM WITH BUILT-IN MALWARE PROTECTION

(75) Inventors: DaJiong Yue, Sichuan (CN); Xiaodong Yuan, Jiangsu (CN)

(73) Assignee: Trend Micro, Inc., Tokyo (JP)

( * ) Notice: Subject to any disclaimer, the term of this patent is extended or adjusted under 35 U.S.C. 154(b) by 1781 days.

(21) Appl. No.: 11/260,030

(22) Filed: Oct. 25, 2005

(51) Int. Cl.
*G06F 21/00* (2006.01)
(52) U.S. Cl. .......................................... 713/187; 726/22
(58) Field of Classification Search .................. 713/152, 713/164, 167, 165, 190, 193, 194, 187, 188, 713/189; 726/22, 23, 24
See application file for complete search history.

(56) References Cited

U.S. PATENT DOCUMENTS

| 5,359,659 | A | * | 10/1994 | Rosenthal | 726/24 |
| 6,073,239 | A | * | 6/2000 | Dotan | 726/24 |

* cited by examiner

*Primary Examiner* — Gilberto Barron, Jr.
*Assistant Examiner* — Izunna Okeke
(74) *Attorney, Agent, or Firm* — Beyer Law Group LLP (57) ABSTRACT

A method of creating a protected software program operates upon an executable program that has a number of sections. The sections include an entry section and any number of user sections. An ability set for the executable program is defined that describes allowed behaviors of said executable program and behaviors that are not allowed. The ability set is inserted into the executable program as an ability section. A vaccine code section is inserted into the executable program; the vaccine code section is arranged to monitor behaviors of said executable program for comparison with the allowed and not allowed behaviors of the ability section. A hash value is calculated for the executable program; the hash value is stored in the program itself or in another secure location.

25 Claims, 8 Drawing Sheets

Executable Program Structure

FIG. 1A
(PRIOR ART)

Program Section S

FIG. 1B
(PRIOR ART)

ELF File Structure

FIG. 1C

FIG. 2
Executable Program Structure (Static)

FIG. 3
Executable Program Structure (Dynamic)

FIG. 4
Computer System

COMPUTER PROGRAM WITH BUILT-IN MALWARE PROTECTION

FIELD OF THE INVENTION

The present invention relates generally to the prevention of attacks on a computer system by a computer virus, etc. More specifically, the present invention relates to a computer program having built-in protection against such attacks.

BACKGROUND OF THE INVENTION

Currently, it is common for malicious software such as computer viruses, worms, spyware, etc., to affect a computer such that it will not behave as expected. Malicious software can delete files, slow computer performance, clog e-mail accounts, steal confidential information, cause computer crashes, allow unauthorized access and generally perform other actions that are undesirable or not expected by the user of the computer.

Current technology allows computer users to create backups of their computer systems and of their files and to restore their computer systems and files in the event of a catastrophic failure such as a loss of power, a hard drive crash or a system operation failure. Unfortunately, these prior art techniques are not effective when dealing with infection of a computer by malicious software. It is important to be able to detect such malware when it first becomes present in a computer system.

One prior art technique for detecting a virus is known as the signature matching technique. This technique is able to detect known malware using a predefined pattern database that compares a known pattern (the virus signature) with the pattern of a suspected virus in order to perform detection. This technique, though, is unable to handle new, unknown malware. Although a new pattern is developed for a computer virus (for example) as soon as the new virus is detected, there is always an interval between when the virus first begins its destruction and when it can be successfully detected and prevented because the spread of a virus is so rapid. Other disadvantages with this technique are that a large pattern database must be maintained and that it can be difficult to defend against an ingenious polymorphic virus.

Other prior art techniques use predefined rules or heuristics to detect unknown malware (heuristic scan techniques). These rules take into account some characteristics of the malware, but these rules need to be written down manually and are hard to maintain. Further, it can be very time-consuming and difficult to attempt to record all of the rules necessary to detect many different kinds of malware. Because the number of rules is often limited, this technique often has a high false-positive rate and a high false-negative rate. Also, a heuristic scan algorithm is fixed so a malicious hacker can attempt to write a new virus in order to bypass the heuristic algorithm.

Prior art mechanisms for installing the above anti-virus techniques also could benefit from improvements. For example, firewall anti-virus software is typically installed on a router, switch or host in order to catch and analyze network data packets. This technology, though, focuses on network data and a hacker attack so it might not have the ability to protect against local propagation and attack. An intrusion detection system or an intrusion prevention system (IDS/IPS) focuses on detecting and preventing an attack over a network. This technique has a speed limitation and further is typically based on pattern recognition and thus inherits the limitations of that prior art technique.

Due to the limitations of the above prior art and a need to detect unknown malicious software as well as limit false positives and false negatives, and improved detection technique is desired.

SUMMARY OF THE INVENTION

To achieve the foregoing, and in accordance with the purpose of the present invention, a technique is disclosed that integrates the security function within the target software itself. The protected software can thus detect and prevent both known and unknown attacks and can protect itself not only in its static state but also in its dynamic, executing state. The present invention thus enables the protected software to defend not only against a traditional virus attack, but also against computer worms, Trojan horses, a remote thread injection and other attacks. This technology can also append polymorphic ability into the protected software so that a potential hacker cannot easily crack the virus prevention. The present invention can also report a new attack quickly, thus assisting with outbreak prevention efforts.

Because a particular computer program itself knows (or its developer knows) what is a normal, accepted set of behaviors and what is not, the present invention can take advantage of that knowledge and use it to detect when abnormal behavior is occurring. When the abnormal behavior occurs, it is likely that malicious software is at work and the present invention can choose to report the incident, terminate the malicious software or stop execution of the program itself. Advantageously, the present invention not only can check the static state of the executable program on disk, but also can monitor the dynamic, running condition of the program while it executes. This technique is advantageous in detecting a computer virus that might only change operation of the program while it is in computer memory and not change its structure when stored on disk.

Further, the executable program is protected in the space domain and in the time domain. In the space domain the software is protected from changes in its static state on disk and its dynamic state. In the time domain the software is protected in that it is known that only certain acceptable behaviors can occur at certain times.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention is applicable to all malicious software, or malware, that generally causes harm to a computer system, provides an effect that is not expected by the user, is undesirable, illegal, or otherwise causes the user to want to restore their computer system from a time prior to when it was infected by the malware. Malware can be classified based upon how is executed, how it spreads or what it does. The below descriptions are provided as guidelines for the types of malware currently existing; these classifications are not exact in that many groups overlap. For example, commercially available "anti-virus" software is designed to scan a computer for viruses and worms, as well as other malicious software. Of course, later developed software not currently known may also fall within the definition of malware.

When computer viruses first originated common targets were executable files and the boot sectors of floppy disks; later targets were documents that contain macro scripts, and more recently, many computer viruses have embedded themselves in e-mail as attachments. With executable files the virus arranges that when the host code is executed the virus code is executed as well. Normally, the host program continues to function after it is infected by the virus. Some viruses overwrite other programs with copies of themselves, thus destroying the program. Viruses often spread across computers when the software or document to which they are attached is transferred from one computer to another.

Computer worms are similar to viruses but are stand-alone software and thus do not require host files or other types of host code to spread themselves; they can move over the Internet using e-mail or socket connections. They do modify the host operating system, however, at least to the extent that they are started as part of the boot process. In order to execute, worms either exploit some vulnerability of the target host or use some kind of social engineering to trick users into executing them. Once executed, a computer worm might drop a backdoor program or a computer virus. Computer viruses and worms have common characteristics and that they both can propagate, they are covert and their effects can be devastating. Other differences are that a virus will attack the affected program while it is running, while a worm can attack other programs; viruses typically attack local files while worms typically attack remote network computers.

A Trojan horse program is a harmful piece of software that is often disguised as legitimate software. Trojan horses cannot replicate themselves, unlike viruses or worms. A Trojan horse can be deliberately attached to otherwise useful software by a programmer, or can be spread by tricking users into believing that it is useful. Some Trojan horses can spread or activate other malware, such as viruses (a dropper). A wabbit is a third, uncommon type of self-replicating malware. Unlike viruses, wabbits do not infect host programs or documents. And unlike worms, rabbits do not use network functionality to spread to other computers. A simple example of a wabbit is a fork bomb.

Spyware is a piece of software that collects and sends information (such as browsing patterns or credit card numbers) about users and the results of their computer activity without explicit notification. Spyware usually works and spreads like Trojan horses. The category of spyware may also include adware that a user deems undesirable. A backdoor is a piece of software that allows access to the computer system by bypassing the normal authentication procedures. There are two groups of backdoors depending upon how they work and spread. The first group work much like a Trojan horse, i.e., they are manually inserted into another piece of software, executed via their host software and spread by the host software being installed. The second group work more like a worm in that they get executed as part of the boot process and are usually spread by worms carrying them as their payload. The term ratware has arisen to describe backdoor malware that turns computers into zombies for sending spam.

An exploit is a piece of software that attacks a particular security vulnerability. Exploits are not necessarily malicious in intent—they are often devised by security researchers as a way of demonstrating that vulnerability exists. They are, however, a common component of malicious programs such as network worms. A root kit is software inserted onto a computer system after an attacker has gained control of the system. Root kits often include functions to hide the traces of the attack, as by deleting logged entries or by cloaking the attacker's processes. Root kits might include backdoors, allowing the attacker to easily regain access later or to exploit software to attack other systems. Because they often hook into the operating system at the kernel level to hide their presence, root kits can be very hard to detect.

Key logger software is software that copies a computer user's keystrokes to a file which it may send to a hacker at a later time. Often the key logger software will only awaken when a computer user connects to a secure web site such as a bank. It then logs the keystrokes, which may include account numbers, PINs and passwords, before they are encrypted by the secure web site. A dialer is a program that replaces the telephone number in a modem's dial-up connection with a long-distance number (often out of the country) in order to run up telephone charges on pay-per-dial numbers, or dials out at night to send key logger or other information to a hacker. Software known as URL injection software modifies a browser's behavior with respect to some or all domains. It modifies the URL submitted to the server to profit from a given scheme by the content provider of the given domain. This activity is often transparent to the user.

A robot network or botnet is a large number of compromised computers that are used to create denial of service attacks or to send spam autonomously (also termed a zombie army). A target computer is often compromised via a Trojan horse that opens an IRC channel and waits for remote commands from the person in control of the botnet. The software of the botnet (botware) may be run as an independent process, but it tends to run inside other normal processes.

Other techniques used by malware include the following. A remote buffer overflow attack takes advantage of a security flaw in a computer and can be used by a worm, botnet, or by a hacker's remote control. Remote thread injection is a software development technique used to inject code into another process to run it as a thread. A hacker can use this same technology to propagate others processes without any file operations in order to disguise malware.

Computer Program Structure

The present invention is suitable for use with a wide variety of types and formats of executable software that is to be protected from malware. The below description provides an example of the use of the invention with software written in the portable executable (PE) format. As is known in the art, the portable executable format is an executable file format used in 32-bit and 64-bit versions of Microsoft operating systems. The portable executable format is a modified version of the UNIX COFF file format. Of course, the present invention applies to executable files in other formats as well. Other examples of executable files include a DOS executable file, a 16-bit executable file, a 64-bit executable file, and the CMD file type, all available in various Microsoft operating systems. Other examples include the a.out, COFF and ELF file formats of the UNIX and Linux operating systems.

In general, an executable file is a computer file whose contents are meant to be considered as a program by a computer. An executable file might contain information which is not part of the program itself, such as information on the environment required to run the program, debugging and symbolic information, or other information used by the operating system to prepare the program to be run. Executable files might also contain calls to operating system services. An executable file may be a program in source form (i.e., human readable), or a program in machine-readable form and as used herein refers to any file that can ultimately be executed by a computer. An executable file available in source code can be protected more easily, but the source code is not always available.

Figure 1A:
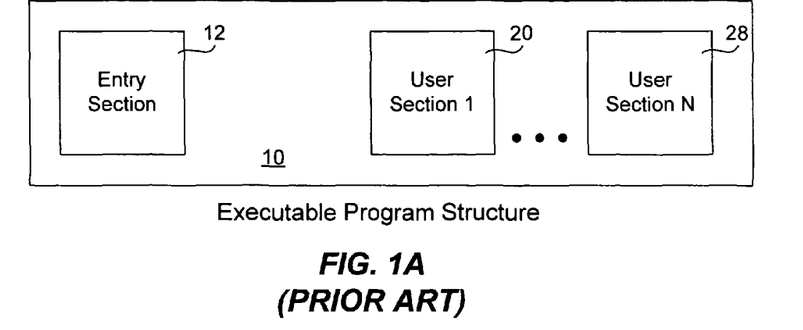
FIG. 1A is a block diagram of a prior art executable program structure in accordance with an embodiment of the invention.
Figure 1B:
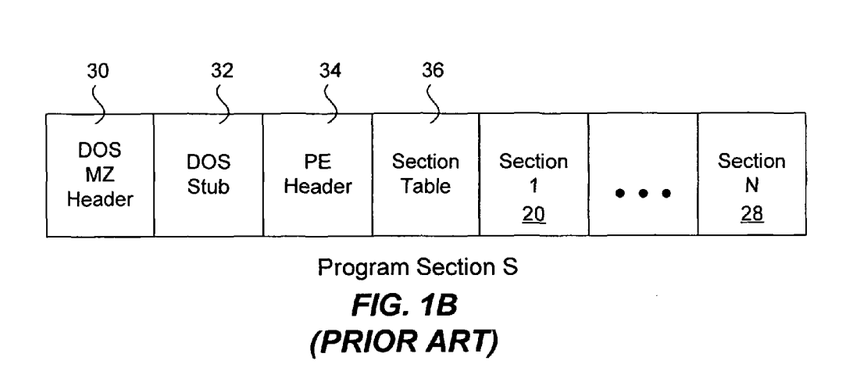
FIG. 1B is a block diagram of an example of prior art program sections found within an executable program in accordance with an embodiment of the invention.

FIG. 1A is a block diagram of a prior art executable program structure 10 in accordance with an embodiment of the invention. Included within the executable program is an entry section 12 consisting of computer program code for initializing and executing the program, and any number of user sections 20-28 that include functionality to be performed by the computer program. FIG. 1B is a block diagram of an example of prior art program sections found within an executable program in accordance with an embodiment of the invention. Shown are example sections from a portable executable (PE) file. Included are sections 30-34 (within an entry section), a section table 36 and any number of user sections 20-28.

Figure 1C:
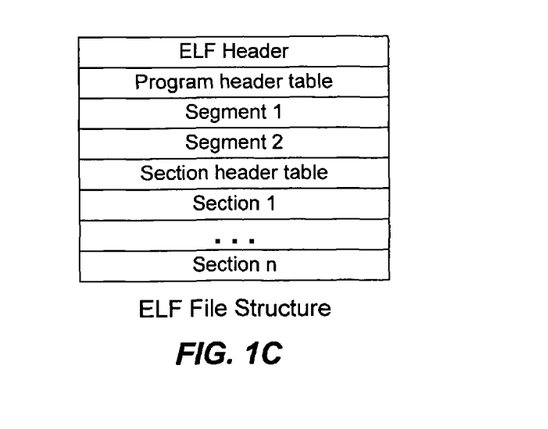
FIG. 1C is a block diagram of an example of a prior art ELF (executable and linking format) file.

FIG. 1C is a block diagram of an example of a prior art ELF (executable and linking format) file. Generally, there are three kinds of ELF formats available: LSB executable, LSB relocatable and LSB shared object. FIG. 1C is an example of the first kind.

Figure 2:
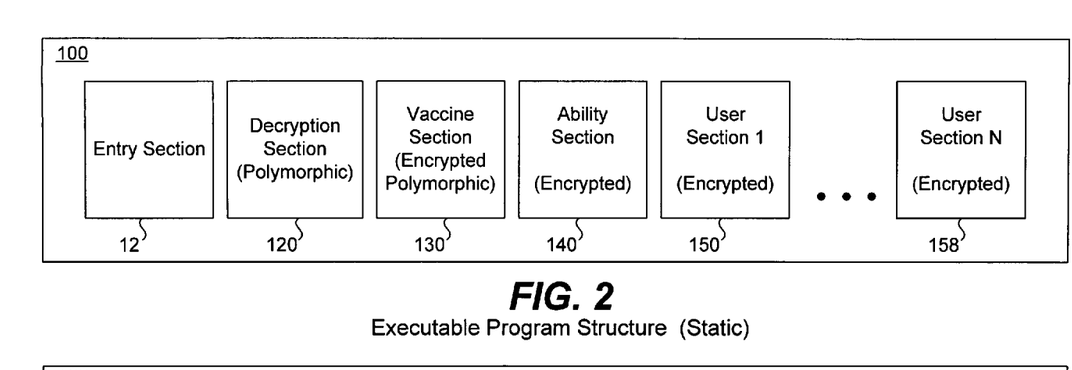
FIG. 2 is a block diagram of an executable program structure according to an embodiment of the invention.

FIG. 2 is a block diagram of an executable program structure 100 according to an embodiment of the invention. Program 100 illustrates the state of the program after it has been protected by an embodiment of the invention and it is stored on disk (for example), i.e., the static state of the program. As described in greater detail below, once sections 120-140 are inserted into the program an encryption algorithm is used to encrypt certain portions of the program. Encryption is used so that a computer virus or other malware cannot detect the nature of each section and cannot remove those sections that are protecting the computer program.

Any of a wide variety of encryption techniques and algorithms may be used to encrypt the various sections. By way of example, these techniques include traditional algorithms (XOR, algorithms based on a dictionary, algorithms based on secrecy), modern symmetric algorithms (DES, IDEA, AES, etc.) and asymmetric algorithms (RSA, etc.). The present invention is able to protect a particular portion of software using more than one technique. An algorithm may be selected from an algorithm database in order to protect a portion of software.

Here is an example of use of a simple XOR algorithm to protect a short portion of code. The assembly code to be protected appears as follows:

```
_asm
{
nop
nop
nop
nop
}
```

In memory, the machine code is written as:
\x90\x90\x90\x90

The encryption algorithm written in the C/C++ language is:

```
for (xor=start-point; xor<encrypt-size; xor++)
{
    original[xor]^=0x99;
}
```

After encryption, the software appears in memory in machine code as:
\x09\x09\x09\x09

The decryption algorithm written in assembly language is:

```
_asm
{
//Decryption Algorithm, adopt "XOR 0x99" logic
    //input: esp esp current address
    //output: esp esp nochange
    mov     eax, esp                //the current value of ESP register is
                                    current address
    add     eax, DecryptLength      //the decrypt start-point
    xor     ecx, ecx                //set loop register to zero
    add     cx, EncryptLength       //the decrypt length, for loop
                                    times
XorTotalCode:
    xor     byte ptr [eax],0x99     //xor 0x99
    add     eax, 1                  //modify process point
    loop    XorTotalCode            //repert
}
```

After decryption, the code appears in memory as:
\x90\x90\x90\x90
and the instructions can be executed normally.

In one embodiment of the invention, once the new sections are inserted into the program, the entire program is encrypted using the encryption algorithm except for entry section 12 and decryption section 120. Entry section 120 is the entrance point in the program and includes the logic executed first by the operating system. Entry section 12 is not encrypted so that the program can begin execution using that section; decryption section 120 is also not encrypted because it will be used to decrypt the other sections that have been encrypted. User sections 150-158 may include instruction code or data and are the sections that implement the user's particular logic.

Decryption section 120 includes computer program code embodying a decryption algorithm to decrypt the other sections that have been encrypted. The decryption section may be polymorphic in that any number of different encryption algorithms are available for use to encrypt a particular computer program. By varying the encryption algorithm that is used for a particular program the present invention thwarts attempts by a hacker to crack a particular algorithm. In an alternative embodiment, each of the various sections in the program that are encrypted are encrypted using a different algorithm and decryption section 120 includes those algorithms to decrypt each section.

Vaccine section 130 includes computer program code whose main function is to check on the run-time status of executable program 100 and to compare its actual behavior with a set of known acceptable behaviors. Section 130 will be described in greater detail below. Ability section 140 is a data section that includes known sets of acceptable (and unacceptable) behavior that may be performed by program 100. In other words, this section includes abilities that are included within the program's functionality and abilities that are excluded from the program's functionality. This section may be embodied in any suitable data structure such as a tree, table, linked list or other.

For example, if it is known that the computer program cannot communicate over a network a suitable entry in the ability section would be "Communicate Network=No." Or, if the computer program cannot perform a file system write then another suitable entry would be "File System Write=No." Further, the program may be protected in the time domain in that any of these entries in the ability section may also be flagged with a particular time of execution or associated with particular checkpoint, meaning that certain acceptable behaviors may only be performed at certain times during the execution of the program.

Figure 7:
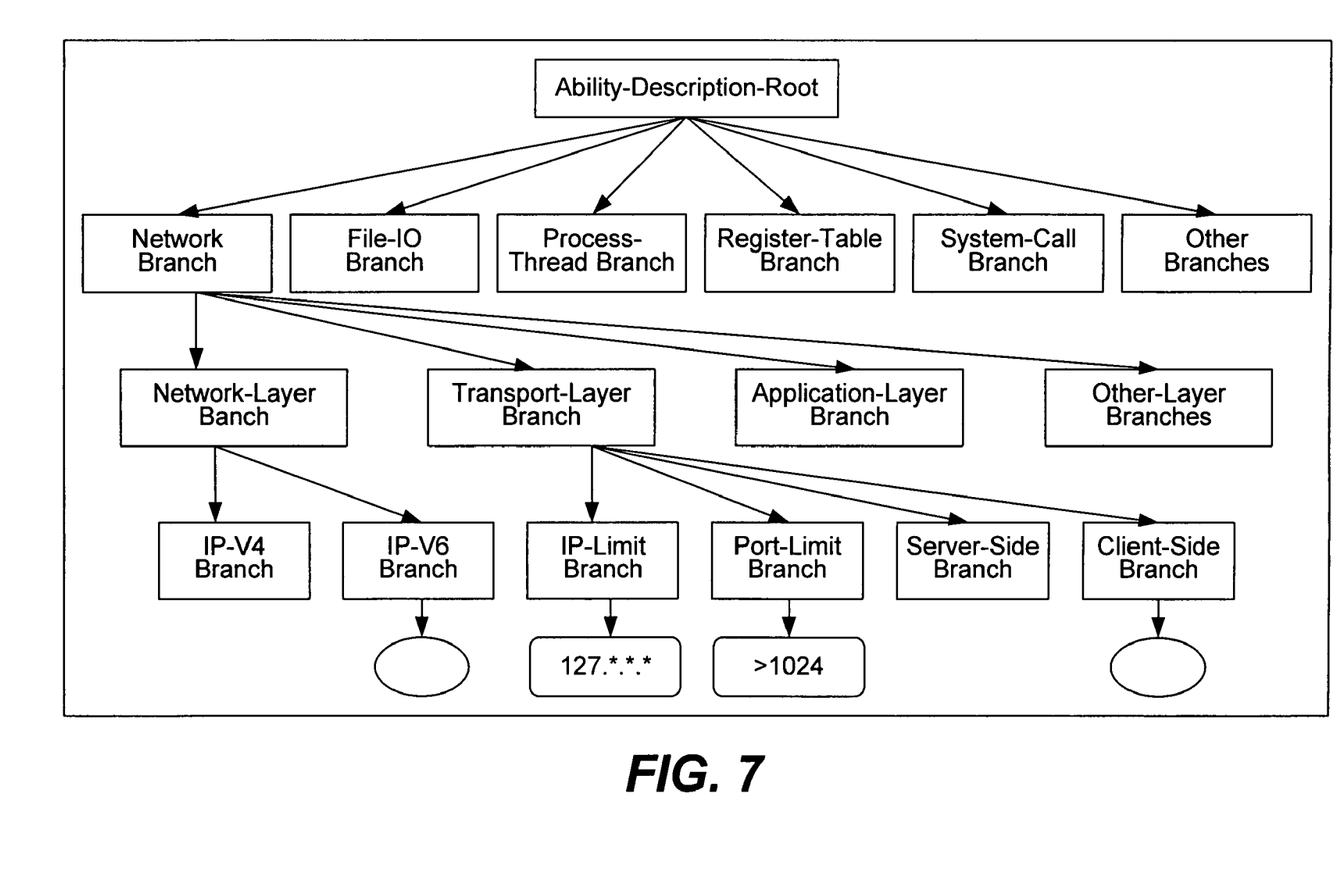
FIG. 7 illustrates a tree data structure showing example behaviors allowed and not allowed by a program.

Other examples of known behaviors that the computer program is allowed to perform and known behaviors that the computer program is not normally allowed to perform are listed in FIG. 7. FIG. 7 illustrates a tree data structure showing example behaviors allowed and not allowed by a program. Shown are abilities in a tree data structure that describe a particular application software program; only part of a network branch is shown. For example, regarding network capabilities, the software has TP-V4 capability but not IP-V6 capability at the network level. Also shown are IP limitations; the software can only receive connections from address 127.*.*.*, and it can only listen on a port greater than 1024. Further, the software cannot connect to another machine as a client; it can only take on the server-side role.

Figure 3:
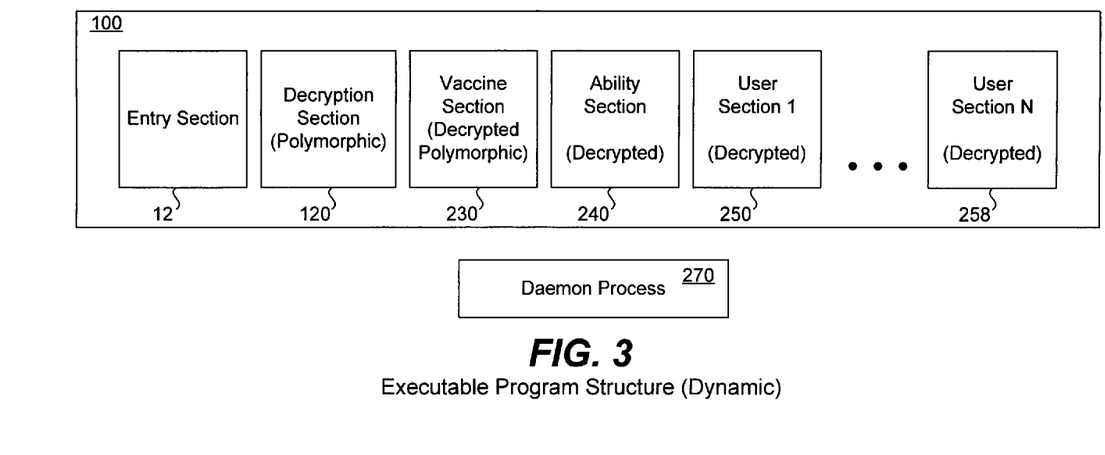
FIG. 3 is a block diagram of an executable program structure according to an embodiment of the invention.

FIG. 3 is a block diagram of an executable program structure 200 according to an embodiment of the invention. Program 200 illustrates the representation of the program as it appears in computer memory once it has been decrypted by code in the decryption section 120. Program 200 works in conjunction with daemon process 270 to dynamically perform run-time checking of the program to insure that no malware has changed the program when it was stored on disk and that no malware modifies the program while it is running. Included are sections 12 and 120 as previously described, and sections 230, 240, 250-258 that have been decrypted.

Figure 4:
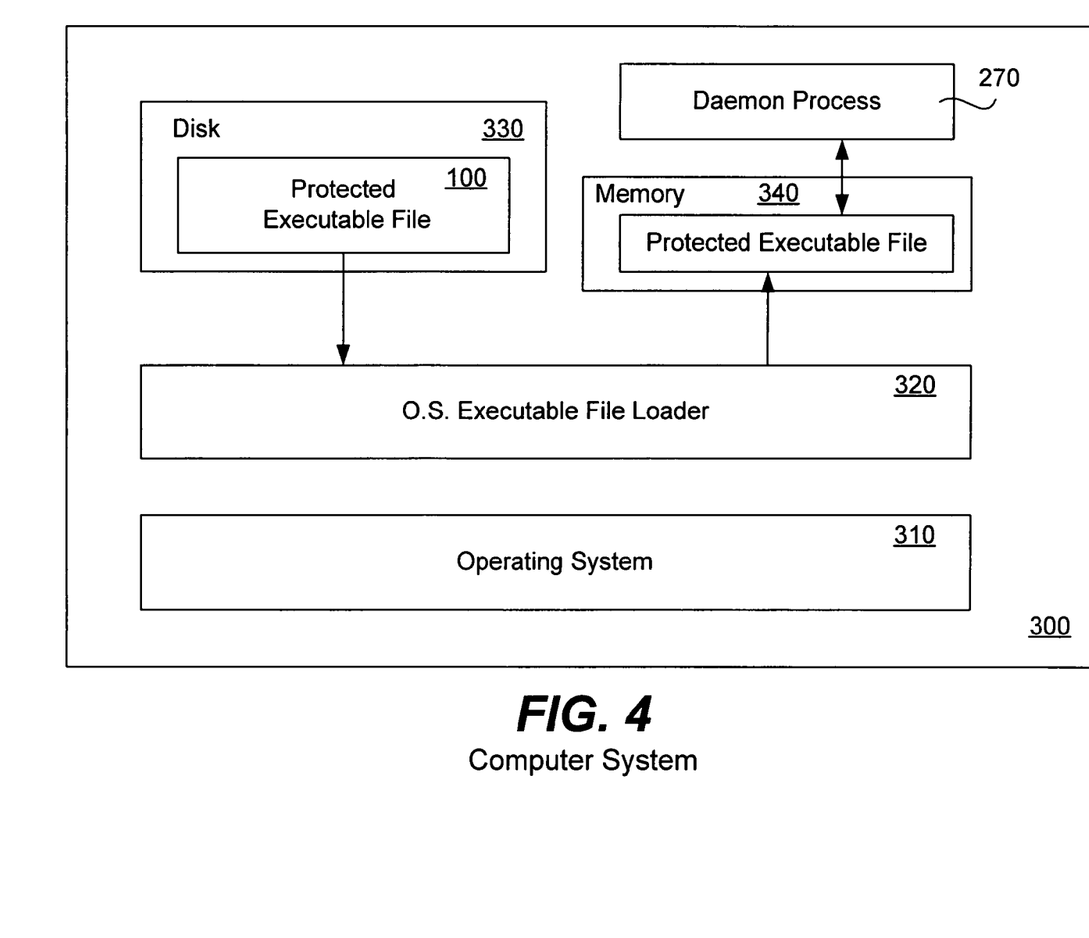
FIG. 4 is a block diagram of a computer system according to an embodiment of the invention.

FIG. 4 is a block diagram of a computer system 300 according to an embodiment of the invention. In this example computer system 300 includes an IBM-compatible computer running a version of a Microsoft operating system 310. Protected executable file 100 is stored on a hard disk 330 (for example) and is loaded into memory 340 by the operating system. A daemon process 270 works in conjunction with the executable file while it is running to provide anti-malware protection.

Flow Diagrams

Figure 5:
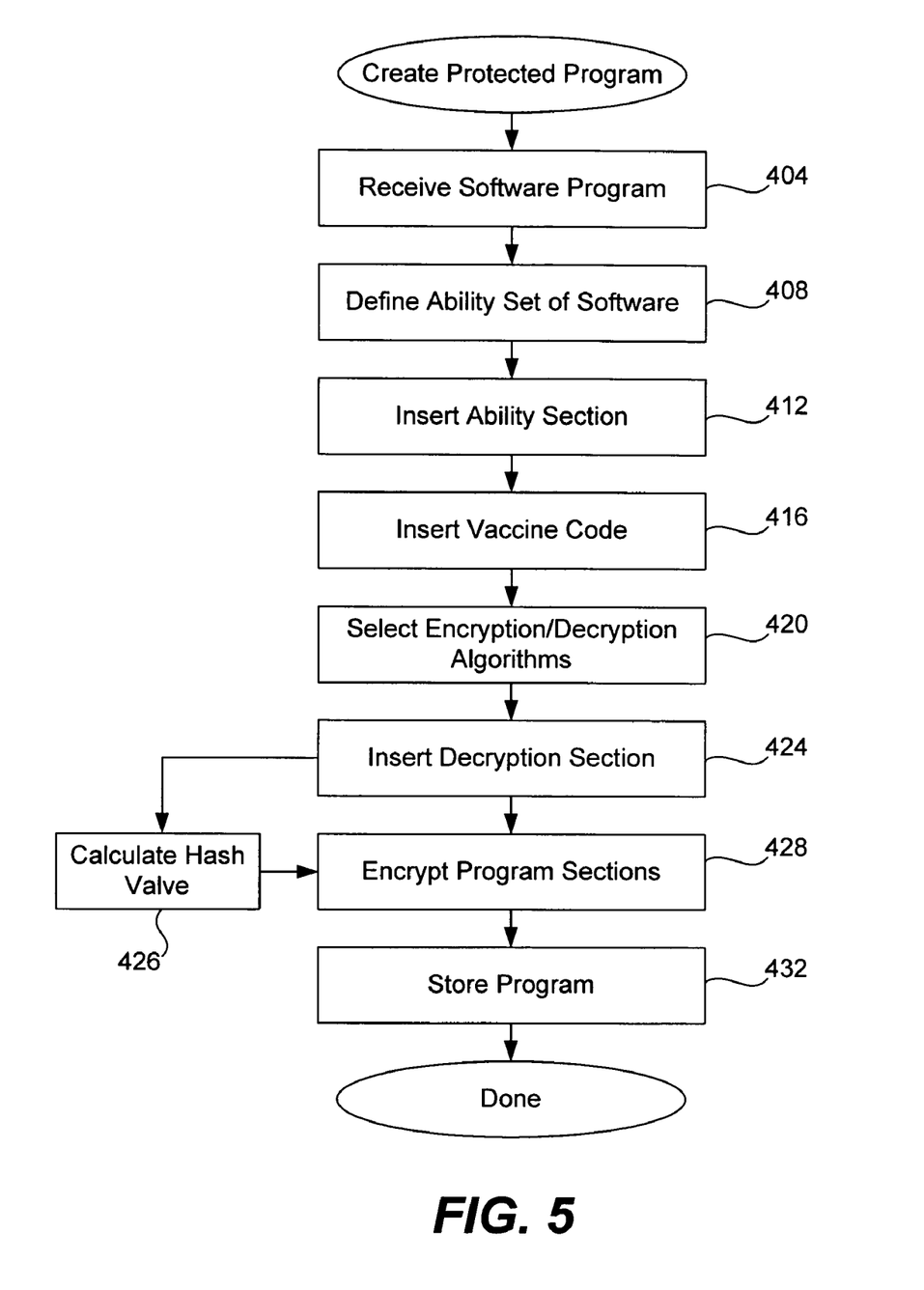
FIG. 5 is a flow diagram describing one embodiment by which a protected program is created.

FIG. 5 is a flow diagram describing one embodiment by which a protected program is created. In step 404 a software program to be protected is received; as described above, this program may be any suitable executable computer program. Although it is contemplated that the present invention may operate on a user computer to retrieve and protect any executable file, the present invention is also suitable for use by a software company that is creating executable programs for distribution. In this scenario, the software company chooses a suitable program, protects it using the steps described below, and then distributes the protected program to computer users.

In step 408 the ability set of the software program in question is defined and organized into a suitable data structure. The ability set includes, for example, whether or not the software is capable of creating a socket for network communications, whether or not the software may access files on disk, etc. The ability set can be collected manually or automatically. When collected manually, the developer of the software (or any other person knowledgeable about the abilities of the software) assists in defining the ability set. For example, an exhaustive list of potential abilities is presented to the developer on a paper form and he or she checks off whether or not the software has that ability. Alternatively, the form is presented on a computer and the developer uses a computer mouse or other input to fill out the form. Or, a more sophisticated software tool works interactively with the developer to query the developer about the abilities of the software and to create a list of abilities that the software can and cannot perform. Generally, a set of software tools may be provided to assist the user to define the ability set of the target software.

The data for the ability section may also be collected automatically. One technique uses a parser to analyze the software source code in order to determine the abilities that the software has and does not have. For example, parsing the source code provides which APIs the software calls and from where the software calls each API. In various programming languages API usage may be designed differently, but the basic code logic is similar. It is always possible to find the pattern of API usage and abstract out a description of the software's abilities. Another automatic technique is to monitor the behavior of the software while it is executing in a known safe environment and to collect an execution log of the software's actions. Such a log will provide good data about the abilities that the software does have, but might not provide the best indication of abilities that the software does not have. It is also contemplated that collection of information to the find the ability set of the software may involve a combination of the above techniques.

Figure 6A:
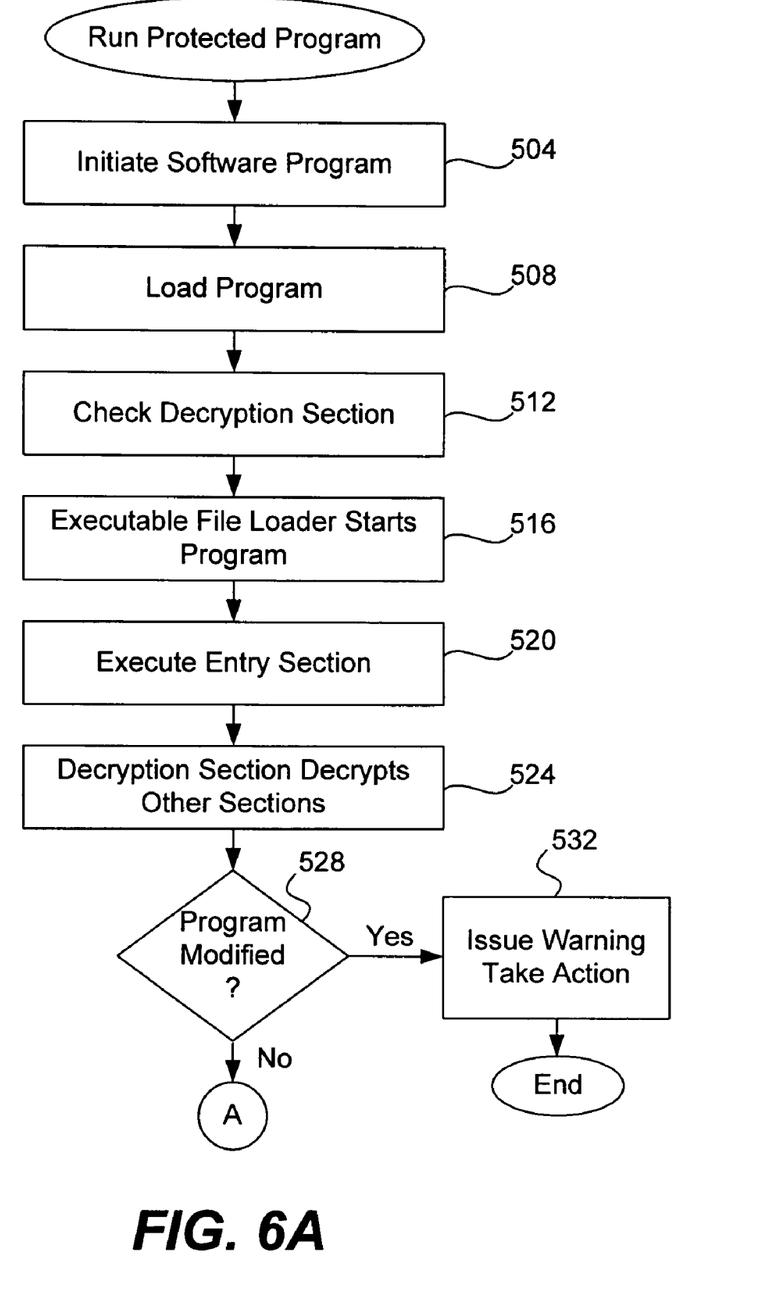
FIGS. 6A and 6B are a flow diagram describing one embodiment by which a protected executable program is run within a computing environment.

In step 412 the ability set of the software is inserted into the executable program as the ability section. Sections may be inserted into the software program in any suitable manner. By way of example, if the program is in portable executable format (PE) then the section table of that program is consulted in order to determine where the section may be added. Once the section table has been consulted and modified, the ability section is inserted into the program as defined by the modification to the section table. In step 416 suitable vaccine code is selected from a collection of vaccine code and is also inserted into the program in a similar manner as the ability section. The functionality of the vaccine code will be described in greater detail below with reference to FIG. 6.

A collection of various types of vaccine code is useful because malware can also recognize a program format. For example, the entry point of a program cannot be protected. The present invention contemplates providing a collection of encryption and vaccine code for different instances of the same protected program. Thus, any hacker must attack the target program on a case-by-case basis and their work is made much more difficult.

In step 420 a suitable encryption algorithm is chosen. Examples of suitable encryption algorithms has been described above and also the possibility of using more than one encryption algorithm to encrypt sections of the program. In step 424 the chosen the decryption algorithm (or algorithms) and suitable code for initiating its use is inserted into a decryption section of the executable program, again, by modifying the section table if the program is in a portable executable format (for example). In step 426 a hash value is calculated for the entire executable program using a suitable hash function. For example, the MD5 algorithm may be used to calculate a message digest (commonly referred to as an "MD5") for the executable program. This message digest represents the static state of the executable program into which the new sections have been inserted and will be used at a later time to determine if any type of malware has attempted to change the program structure. In one embodiment the message digest is stored within the vaccine section to be later retrieved for comparison when a new message digest is calculated. Alternatively, the message digest may be stored in another program section or outside of the program altogether. Or, the entire program may be encrypted before the message digest is stored within it.

In step 428 all program sections are encrypted using the chosen encryption algorithm except for entry section 12 and decryption section 120, resulting in an executable program structure as shown in the example of FIG. 2. Finally, in step 432 the protected program is stored on disk or in another suitable location for later distribution and or execution.

FIG. 6A is a flow diagram describing one embodiment by which a protected executable program is run within a computing environment. The protected program has either been received from a software company in a protected state or a computer user has utilized the present invention to create a protected version of the software program on his or her computer. In step 504 the computer user (for example) performs an action indicating a desire to execute the protected software program. In step 508 the protected program is loaded from disk into memory by a Loader program.

As is known, an executable program to be invoked by an operating system follows any suitable executable file format. If the program has the correct file format, the operating system uses a system executable file loader module to load the program. Basically, the operating system loader reads the executable file into memory, reads the file header bytes, checks and loads related shared libraries into memory, and then begins at the entry point to execute the program. In general, a new executable file loader program need not be developed. It is sufficient to modify the entry point of the target file and to direct the system loader to begin from the new entry point. In an alternative embodiment, in order to increase protection, we can wrap the system loader, load the protected file, and then compare the saved value of the entry point with the current entry point. If the attacking code has modified the protected program, the executable file loader will stop the loading; if the comparison is successful, the loader will call the original system loader to load the target file.

Preferably, in step 512 the Loader checks the decryption section of the program to make sure that the section has not been modified. Any suitable digital signature technique may be used to check the binary format, such as the MD5 algorithm, a CRC, a hash function, etc.

In step 516 the Loader transfers control to the executable file loader of the operating system that then begins execution of the program by executing the entry section in step 520. The entry section will then perform its normal tasks and will eventually transfer control to the decryption section of the program. In one embodiment, control is transferred at the machine code level using a "JUMP" instruction or similar.

In step 524 the decryption section will decrypt the other encrypted sections of the program including the vaccine section, the ability section and all user sections using the appropriate encryption algorithm or algorithms. Once the encrypted sections of the program have been decrypted, control is transferred to the vaccine section so that it may be determined if the static state of the program has changed in step 528. In this step the vaccine section executes code to determine if the program had been changed on disk since it had been first stored. A variety of methods may be used, including any of the Microsoft technical tools or use of a hash function that has been alluded to above. For example, an MD5 has been calculated for the entire program after all of the sections had been inserted but before the program was encrypted. Now that the program has been decrypted this original MD5 value can be retrieved from the vaccine section for comparison to a new MD5. First, the original MD5 value is deleted from the vaccine section and then the same hash function is again used to calculate a new MD5 value for the entire program. Assuming that both MD5's match, this indicates that the program has not been changed since it was on disk and control then moves to step 536.

But, if the MD5's do not match, this indicates that malware has changed the static state of the program on disk and a warning is issued and action taken in step 532. For example, a warning may be given immediately to the end user operating the program as well as sending a warning to a suitable antivirus control center that is monitoring virus outbreaks. In one specific embodiment of the invention, a warning message is sent to the control center operated by Trend Micro, Inc. The warning to the control center may take the form of an e-mail message having as an attachment the decrypted version of the program file and/or the encrypted version of the program file that was stored on disk. In this manner, the control center will be quickly able to determine if a new type of malware is present and take appropriate action.

Alternatively, if the original MD5 had been calculated based upon the encrypted version of the program then calculation of the new MD5 would take place before the program is decrypted in step 524.

Figure 6B:
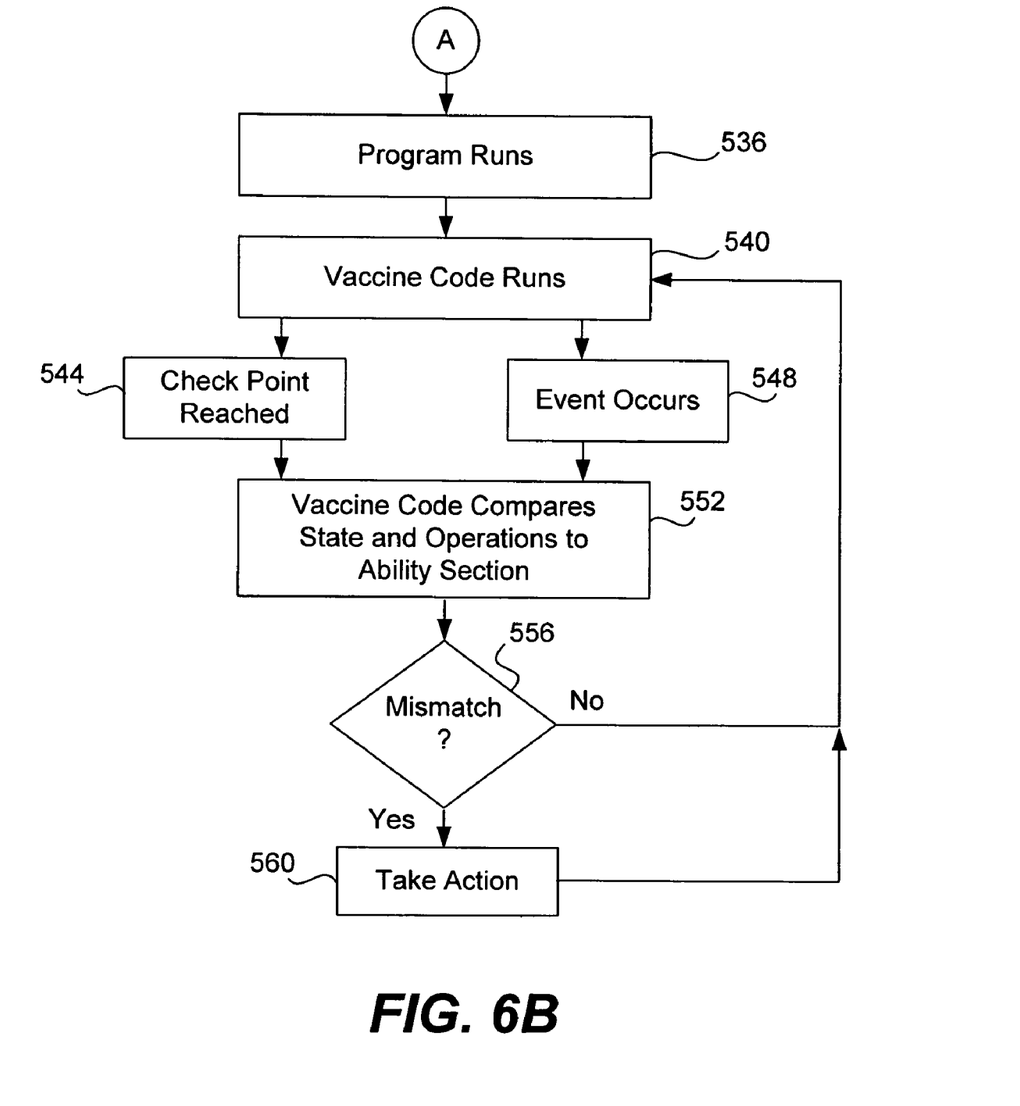

Assuming that both MD5's match, control is then transferred to the vaccine section that allows the program proper to begin execution in step 536. Concurrently, computer code in the vaccine section will begin working in conjunction with daemon process 270 in step 540 to insure that the running software is not subject to a malware attack during execution. While the software is running the vaccine code will determine and judge the running status of the program preferably at particular checkpoints in step 544 or when particular events occur in step 548.

Any of a variety of system operations or events may be used as checkpoints. For example, "registry writing" may be used as a checkpoint as writing to the registry is an important step in being able to run automatically while in the system start up phase; "file writing" may be used as a checkpoint as writing to a file is an important part of malicious code; "socket I/O" may be used as a checkpoint as socket I/O is the main way that malicious code propagates itself. In fact, a checkpoint may be defined by the user. Any potential danger or suspect activity may be defined as a checkpoint. If malware attacks the protected software it will insert malicious code into the protected software. If any unexpected activity occurs the detection logic in the vaccine code will flag it.

In step 552 the vaccine section code will check the system state and current behavior and make sure it matches with the predefined behaviors in the ability section of the program. The goal is to ensure that malware is not able to modify the protected software during execution. For example, if the protected program receives data over a network or is injected by another remote thread the vaccine section will compare this behavior with the accepted behavior in the ability section. Receiving data over a network could be indicative of a remote buffer overflow attack; if receiving data is not listed as an accepted behavior in the ability section then a warning would be generated.

Step 556 determines if a mismatch occurs between the current behavior of the program and the accepted behaviors listed in the ability section. If no mismatch occurs then the program and the monitoring vaccine code continue to run. If there is a mismatch then a warning will be issued as described above and action taken. Action may result in operations or data being held up or termination of the program. In one embodiment, a warning includes sending an e-mail message to an anti-virus control center along with an attachment that includes the run-time state of the executing program. If the mismatch is relatively benign the program may be allowed to continue, but if risk is present the program may be terminated.

Daemon process 270 interacts with the protected software program as follows. Assuming that there is more than one protected software program within a computer system, having more than one operating vaccine code and monitor logic would be redundant. Thus, the logic is abstracted out to create an independent module to be shared amongst all of the protected programs. This so-called daemon process may be implemented using various system kernel technologies such as kernel device driver technology. The daemon process monitors system behaviors such as system calls and registry operations. The daemon process thus checks and monitors any such sensitive, suspect or interesting operations; it judges these operations and in some cases may delay or postpone important operations. When a suspect operation occurs, the daemon process immediately notifies the protected software using any suitable predefined protocol. The vaccine code of the protected program then receives this suspect's event and alert from the daemon process and judges whether or not the event is valid based upon the current state of the software. The vaccine code then releases a result indicating whether the event is abnormal or normal, and whether or not the operation should continue. In those embodiments where there is only a single protected software program within the computer system (or when it is otherwise desirable), the logic of the daemon process may be implemented within the protected software itself.

Computer System Embodiment

Figure 8A:
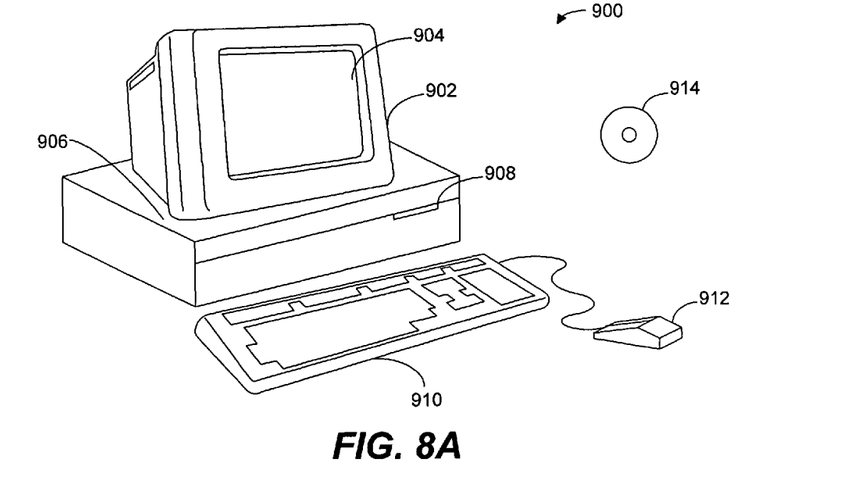
FIGS. 8A and 8B illustrate a computer system suitable for implementing embodiments of the present invention.
Figure 8B:
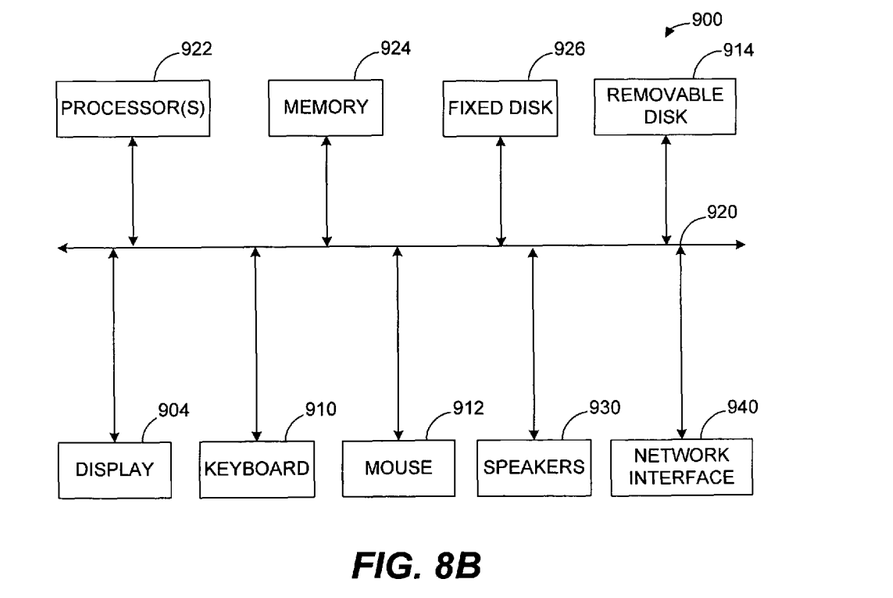

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of creating a protected software program, said method comprising:

receiving an executable software program having a plurality of user sections that perform behaviors of said program;

defining an ability set for said executable program that describes behaviors not allowed and allowed behaviors of said executable program during execution of said executable program;

inserting said ability set into said executable program as an ability section using a computer, said ability section being distinct from said user sections;

inserting vaccine code into said executable program as a vaccine code section using said computer, said vaccine code section being arranged to monitor, during execution of said executable program, said behaviors of said executable program for comparison with said allowed behaviors of said ability section;

encrypting said vaccine code section; and calculating a hash value for said executable program and storing said hash value in a later accessible location, said hash value representing the static state of said executable program.

2. A method as recited in claim 1 further comprising:

selecting an encryption algorithm and a corresponding decryption algorithm;

encrypting at least one of said plurality of sections of said executable program; and storing said corresponding decryption algorithm in a decryption section of said executable program, said decryption algorithm being suitable for decrypting said section that has been encrypted.

3. A method as recited in claim 1 further comprising:

selecting a plurality of encryption algorithms and corresponding decryption algorithms;

encrypting a subset of said plurality of sections of said executable program using said encryption algorithms, each encrypted section being encrypted by one of said encryption algorithms; and storing said corresponding decryption algorithms in a decryption section of said executable program, said decryption algorithms being suitable for decrypting said sections that have been encrypted.

4. A method as recited in claim 1 further comprising:

selecting an encryption algorithm and a corresponding decryption algorithm;

storing said corresponding decryption algorithm in a decryption section of said executable program, said decryption algorithm being suitable for decrypting information that has been encrypted using said encryption algorithm; and encrypting all sections of said executable program using said encryption algorithm except for said decryption section and an entry section of said executable program.

5. A method as recited in claim 1 further comprising:

storing said hash value in said vaccine code section of said executable program.

6. A method as recited in claim 4 further comprising:

calculating said hash value after said step of encrypting.

7. A non-transitory computer-readable medium comprising computer code representing an executable software program having a plurality of sections, said computer code comprising:

a decryption section including a decryption algorithm for decrypting information encrypted by a corresponding encryption algorithm;

an entry section representing the entrance point for the executable program, said entry section including a pointer to said decryption section;

an ability section including an ability set for said executable program that describes behaviors not allowed and allowed behaviors of said executable program during execution of said executable program, said ability section being encrypted by said encryption algorithm and being distinct from said at least one user section;

a vaccine code section including code arranged to monitor, during execution of said executable program, said functions of said executable program for comparison with said allowed behaviors of said ability section, said vaccine code section being encrypted by said encryption algorithm; and at least one user section including code arranged to perform functions of said executable program, said user section being encrypted by said encryption algorithm.

8. A non-transitory computer readable medium as recited in claim 7 further comprising:

a plurality of decryption algorithms stored in said decryption section, each of said decryption algorithms arranged to decrypt information encrypted by a corresponding encryption algorithm, wherein each of said encrypted sections of said executable program is encrypted using one of said encryption algorithms.

9. A non-transitory computer readable medium as recited in claim 7 wherein said entry section and said decryption section are encrypted using an encryption algorithm.

10. A non-transitory computer readable medium as recited in claim 7 further comprising:

a hash value stored in one of said sections of said executable program, said hash value being calculated using a hash function applied to said executable program and representing a static state of said executable program.

11. A non-transitory computer readable medium as recited in claim 10 wherein said hash value is stored in said vaccine code section of said executable program.

12. A non-transitory computer readable medium as recited in claim 10 wherein said hash value is calculated after said encrypted sections of said executable program have been encrypted.

13. A non-transitory computer-readable medium comprising computer code representing an executable software program having a plurality of sections, said computer code comprising:

a decryption section including a decryption algorithm for decrypting information encrypted by a corresponding encryption algorithm;

an entry section representing the entrance point for the executable program, said entry section including a pointer to said decryption section;

an ability section including an ability set for said executable program that describes behaviors not allowed and allowed behaviors of said executable program during execution of said executable program, said ability section being distinct from said at least one user section;

a vaccine code section including code arranged to monitor, during execution of said executable program, said functions of said executable program for comparison with said allowed behaviors of said ability section, said vaccine code section being encrypted by said encryption algorithm; and at least one user section including code arranged to perform functions of said executable program.

14. A non-transitory computer readable medium as recited in claim 13 further comprising:

a plurality of decryption algorithms stored in said decryption section, each of said decryption algorithms arranged to decrypt information encrypted by a corresponding encryption algorithm.

15. A non-transitory computer readable medium as recited in claim 13 further comprising:

a hash value stored in one of said sections of said executable program, said hash value being calculated using a hash function applied to said executable program and representing a static state of said executable program.

16. A non-transitory computer readable medium as recited in claim 15 wherein said hash value is stored in said vaccine code section of said executable program.

17. A non-transitory computer readable medium as recited in claim 15 wherein said hash value is calculated after sections of said executable program are encrypted.

18. A method of creating a protected software program, said method comprising:
- receiving an executable software program having a plurality of user sections that perform behaviors of said program;
- analyzing said executable software program to determine normal behaviors of said program during execution and behaviors of said program that are not normal during execution;
- defining an ability set for said executable program that describes said normal behaviors of said executable program and said behaviors that are not normal;
- inserting said ability set into said executable program as an ability section using a computer, said ability section being distinct from said user sections;
- inserting vaccine code into said executable program as a vaccine code section using said computer, said vaccine code section being arranged to monitor, during execution of said executable program, behaviors of said executable program for comparison with said normal behaviors and said behaviors that are not normal of said ability section, said vaccine code section being encrypted; and
- storing said executable program onto a non-transitory computer-readable medium of said computer.

19. A method as recited in claim 1 wherein said executable software program is source code.

20. A non-transitory computer-readable medium as recited in claim 7 wherein said executable software program is source code.

21. A non-transitory computer-readable medium as recited in claim 13 wherein said executable software program is source code.

22. A method as recited in claim 18 wherein said executable software program is source code.

23. A method as recited in claim 18 further comprising:
- calculating a hash value for said executable program and storing said hash value in a later accessible location, said hash value representing the static state of said executable program.

24. A method as recited in claim 18 further comprising:
- calculating a hash value for said executable program and storing said hash value said vaccine code section, said hash value representing the static state of said executable program.

25. A method as recited in claim 23 further comprising:
- calculating said hash value after said step of encrypting.

* * * * *